US009038055B2

(12) United States Patent
Mutisya et al.

(10) Patent No.: US 9,038,055 B2
(45) Date of Patent: May 19, 2015

(54) USING VIRTUAL MACHINES TO MANAGE SOFTWARE BUILDS

(75) Inventors: Hillary Mucheru Mutisya, Seattle, WA (US); Benjamin W. Goldsmith, Seattle, WA (US); Edward Griffin Sheppard, III, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/198,728

(22) Filed: Aug. 5, 2011

(65) Prior Publication Data

US 2013/0036402 A1  Feb. 7, 2013

(51) Int. Cl.
  *G06F 9/445*  (2006.01)
  *G06F 9/44*   (2006.01)
  *G06F 11/36*  (2006.01)
  *G06F 9/455*  (2006.01)

(52) U.S. Cl.
  CPC .............. *G06F 8/71* (2013.01); *G06F 11/3688* (2013.01); *G06F 11/3692* (2013.01); *G06F 9/45533* (2013.01)

(58) Field of Classification Search
  USPC .................................................. 717/168–178
  See application file for complete search history.

(56) References Cited

U.S. PATENT DOCUMENTS

| | | | |
|---|---|---|---|
| 6,438,749 B1 | 8/2002 | Chamberlain | |
| 6,785,721 B1 | 8/2004 | Immerman et al. | |
| 6,980,521 B1 | 12/2005 | Jarvis | |
| 7,210,143 B2 | 4/2007 | Or et al. | |
| 7,630,877 B2 | 12/2009 | Brown et al. | |
| 7,657,887 B2 | 2/2010 | Kothandaraman et al. | |
| 7,757,226 B2 | 7/2010 | Srivastava et al. | |
| 7,840,961 B1 | 11/2010 | Wethersby | |
| 8,205,194 B2 | 6/2012 | Fries et al. | |
| 8,307,437 B2 | 11/2012 | Seves et al. | |
| 8,429,639 B2 * | 4/2013 | Jirka | 717/168 |
| 2003/0130985 A1 | 7/2003 | Driesen et al. | |
| 2004/0225952 A1 | 11/2004 | Brown et al. | |
| 2005/0251523 A1 | 11/2005 | Rajamani et al. | |
| 2005/0262503 A1 | 11/2005 | Kane et al. | |
| 2006/0253848 A1 | 11/2006 | Mathieu et al. | |
| 2008/0028218 A1 | 1/2008 | Simon | |
| 2008/0098046 A1 | 4/2008 | Alpern et al. | |

(Continued)

OTHER PUBLICATIONS

U.S. Official Action dated Feb. 11, 2013 in U.S. Appl. No. 13/197,772.

(Continued)

*Primary Examiner* — Chuck Kendall
(74) *Attorney, Agent, or Firm* — Steve Crocker; Jim Ross; Micky Minhas

(57) ABSTRACT

Concepts and technologies are described herein for using virtual machines to manage software builds. A deployment controller manages deployment of a new software build. The deployment controller installs the new software build on test device and tests the new software build. If the new software build functions without errors, the new software build is deployed to hosts of a data center and monitored for errors. If errors are detected, the errors are reported to a developer associated with the new software build. In some embodiments, the deployment controller creates a differencing disk storing differences between the updated software build and an existing software build and uses the differencing disk for installing the new software build for testing and/or for deploying the new software build.

19 Claims, 5 Drawing Sheets

(56) References Cited

U.S. PATENT DOCUMENTS

| | | | |
|---|---|---|---|
| 2008/0276234 | A1 | 11/2008 | Taylor et al. |
| 2009/0217163 | A1 | 8/2009 | Jaroker |
| 2009/0265425 | A1 | 10/2009 | Lipscomb et al. |
| 2009/0300057 | A1* | 12/2009 | Friedman .................. 707/102 |
| 2009/0300151 | A1 | 12/2009 | Friedman et al. |
| 2010/0058319 | A1 | 3/2010 | Kawaguchi et al. |
| 2010/0088281 | A1 | 4/2010 | Driesen et al. |
| 2010/0185827 | A1 | 7/2010 | Lowery |
| 2010/0192143 | A1 | 7/2010 | Ingle et al. |
| 2010/0205594 | A1 | 8/2010 | Jirka |
| 2010/0223378 | A1 | 9/2010 | Wei |
| 2010/0281456 | A1 | 11/2010 | Eizenman et al. |
| 2011/0004735 | A1 | 1/2011 | Arroyo et al. |
| 2011/0016461 | A1 | 1/2011 | Bankston et al. |
| 2011/0061046 | A1 | 3/2011 | Phillips |
| 2011/0126197 | A1 | 5/2011 | Larsen et al. |
| 2011/0161952 | A1 | 6/2011 | Poddar et al. |
| 2011/0296403 | A1 | 12/2011 | Janzen |
| 2012/0089972 | A1 | 4/2012 | Scheidel et al. |
| 2012/0304175 | A1 | 11/2012 | Damola et al. |
| 2013/0036237 | A1 | 2/2013 | Mutisya et al. |
| 2013/0036328 | A1* | 2/2013 | Mutisya et al. ............ 714/15 |

OTHER PUBLICATIONS

Yeung, Andrew., "From Development to Production: Streamlining SharePoint Deployment with DocAve® Deployment Manager", Retrieved at <<http://www.avepoint.com/assets/pdf/sharepoint_whitepapers/DocAve_Deployment_Manager_Technical_White_Paper.pdf>>, Technical White Paper, Mar. 2009, pp. 22.

"Introduction to Content Types", Retrieved at <<http://msdn.microsoft.com/en-us/library/ms472236.aspx>>, May 2010, pp. 3.

"List Template", Retrieved at <<http://msdn.microsoft.com/en-us/library/ms434306.aspx>>, May 2010, pp. 2.

"Site Types: WebTemplates and Site Definitions", Retrieved at <<http://msdn.microsoft.com/en—us/library/ms434313.aspx>>, May 2010, pp. 3.

"Using the Change Log", Retrieved at <<http://msdn.microsoft.com/en-us/library/bb447511.aspx>>, May 2010, pp. 2.

Slawinska, et al., "Automated Deployment Support for Parallel Distributed Computing", Retrieved at <<http://ieeexplore.ieee.org/stamp/stamp.jsp?tp=&arnumber=4135271>>, Proceedings of the 15th Euromicro International Conference on Parallel, Distributed and Network-Based Processing, Feb. 7-9, 2007, pp. 5.

Hou, et al., "ADEM: Automating Deployment and Management of Application Software on the Open Science Grid", Retrieved at <<http://ieeexplore.ieee.org/stamp/stamp.jsp?tp=&arnumber=5353083>>, Proceedings of 10th IEEE/ACM International Conference on Grid Computing, Oct. 13-15, 2009, pp. 130-137.

Xiaoshe, et al., "Research on an Automatic Deployment Mechanism of Monitor Service in Grid Environment", Retrieved at <<http://ieeexplore.ieee.org/stamp/stamp.jsp?tp=&arnumber=4031531>>, Proceedings of the Fifth International Conference on Grid and Cooperative Computing Workshops, Oct. 2006, pp. 63-70.

Merle, et al., "Open Architecture for Building Large Scale Deployment systems", Retrieved at <<http://adele.imag.fr/Les.Publications/intConferences/SERP2004Mer.pdf>>, In Proceedings of Software Engineering Research and Practice, 2004, pp. 7.

Windows Workflow Foundation, Retrieved at <<http://msdn.microsoft.com/en-us/netframework/aa663328.aspx>>, Retrieved Date: Mar. 17, 2011, p. 1.

ExternalDataExchangeService Class, Retrieved at <<http://msdn.microsoft.com/en-us/library/system.workflow.activities.externaldataexchangeservice.aspx>>, Retrieved Date: Mar. 17, 2011, pp. 5.

U.S. Official Action dated May 30, 2013 in U.S. Appl. No. 13/197,772.

Anderson, Tim., "VS2010: Lifecycle Management", Retrieved at <<http://www.softwareknowhow.info/Buyers-Guide/VS2010:-Lifecycle-Management/82>>, Visual Studio 2010, Issue 47, Jan. 2, 2010, pp. 3.

"Great Tools, Great Testers, Great Software.", Retrieved at <<http://www.microsoft.com/india/msidc/servertools/vstb.aspx>>, Retrieved Date: Mar. 18, 2011, pp. 2.

Petri, Daniel., "Creating Differencing Disks with Microsoft Virtual PC", Retrieved at <<http://www.petri.co.il/virtual_creating_differencing_disks_with.htm>>, Jan. 8, 2009, pp. 5.

"Build and Deploy Continuously", Retrieved at <<http://msdn.microsoft.com/en-us/library/ee308011.aspx>>, Retrieved Date: Mar. 17, 2011, pp. 6.

"Electric Cloud Integrates with VMware Lab Manager to Deliver Virtualized Build and Test Automation", Retrieved at <<http://buildguru.com/news/2007-1107b.php>>, Nov. 7, 2007, pp. 2.

"Using Differencing Disks", Retrieved at <<http://technet.microsoft.com/en-us/library/cc720381%28WS.10%29.aspx>>, Retrieved Date: Mar. 21, 2011, pp. 4.

Graham-Cumming, John., "Software Builds and the Virtual Time Machine", Retrieved at <<http://drdobbs.com/architecture-and-design/205917147>>, Jan. 23, 2008, pp. 3.

U.S. Official Action dated Aug. 14, 2013 in U.S. Appl. No. 13/197,794.

Meng, et al., "Improving the scalability of data center networks with traffic-aware virtual machine placement," Mar. 2010, In INFOCOM, Proceedings IEEE, pp. 1-9.

Munro, "Virtual Machines & VMware, Part I.", Dec. 21, 2001, Available at: http://atlas.binus.ac.id/PDC/EasWeb2.nsf/0/d6f02e9dba8b088247256bf7001f3bd3/$ FILE IVirtual%20Machines%20VMware.pdf, 21 pp.

Patil et al., "Run-time dependency tracking in data centers," 2010, In Proceedings of the Third Annual ACM Bangalore Conference (COMPUTE '10) ACM, New York, NY, USA, Article 5, 6 pp.

Aguiar et al., "The application of distributed virtual machines for enterprise computer management: a two-tier network file system for image provisioning and management," 2008, 32nd Annual IEEE International, pp. 428-431.

U.S. Notice of Allowance dated Jan. 2, 2014 in U.S. Appl. No. 13/197,794.

U.S. Official Action dated May 28, 2014 in U.S. Appl. No. 13/197,772.

U.S. Notice of Allowance dated Sep. 19, 2014 in U.S. Appl. No. 13/197,772.

* cited by examiner

USING VIRTUAL MACHINES TO MANAGE SOFTWARE BUILDS

BACKGROUND

Software installation or upgrade operations often are completed by way of executing an installation software program. In particular, executable code for installing or updating the software is developed and compiled into an installation package that, when executed, install or update any components needed to execute the updated or installed software package. These installation packages can be distributed as .msi files, .exe files, and/or other formats. While this format is convenient and suitable for most purposes, execution of the installation packages can be time consuming and distribution of the installation packages can consume a large amount of network resources due to the relatively large size of the installation package.

In some hosted computing environments, software can be hosted by a number of servers or other computing devices. When new versions, updates, or patches for the hosted software are developed or made available, multiple servers or other devices hosting the software may need to be updated. Because of the time- and resource-consuming nature of the installation packages typically distributed for making these changes, the updating of hosted software can consume large amounts of resources.

Furthermore, because multiple devices may cooperate to provide functionality associated with hosted software, failures or errors experienced during an installation or update operation with respect to any of the devices may impact performance of the updated software as a whole. If failures or errors are not detected after upgrading or installing the various components of the hosted software, expensive and resource-consuming uninstallation and/or rollback operations may need to be performed to remove the application or upgrade. Because hosted software may evolve and may be updated frequently, these resource-intensive upgrade and installation processes can be difficult to accommodate.

It is with respect to these and other considerations that the disclosure made herein is presented.

SUMMARY

Concepts and technologies are described herein for using virtual machines to manage software builds. In accordance with the concepts and technologies disclosed herein, a deployment controller manages deployment of a new software build to one or more virtual machines executing within a data center. If code corresponding to an update such as a patch, a version upgrade, an installation file, or other software change is received, the deployment controller can compile the code to generate an installation package for installing the new software build. The deployment controller can install the new software build on a virtual hard drive or other device corresponding to a test device, and determine if errors are detected in operation of the new software build in the test environment. If the deployment controller does not detect errors in the operation of the new software build, the deployment controller can determine that the new software build is to be deployed for hosting. In some embodiments, the deployment controller creates the new software build by creating a differencing disk storing differences between the updated software build and an existing software build. Installation of the new software build on the test device can therefore include copying the differencing disk to the test device and linking the differencing disk to a virtual hard drive hosting the existing software build.

The deployment controller also can manage deployment of the new software build to one or more hosts such as a data center. In some embodiments, the code is deployed, at least in part, by deploying or making available for copying a differencing disk and linking the copied differencing disk to a virtual hard drive hosting an existing software build. In some embodiments, the differencing disk is generated without deploying the new software build. For example, the deployment controller can determine how an installation script is to modify the existing software build or via other processes. Performance of the deployed new software build is monitored by the deployment controller. If errors are detected by the deployment controller during or after deployment of the new software build, the deployment controller can create an error report and report the errors to a developer associated with the code and/or the new software build. The error report can be provided to the developer to initiate error resolution.

According to one aspect, code received by the deployment controller is used to create a new software build. The new software build can be a copy of a virtual hard drive hosting the existing software build and a linked differencing disk that indicates changes between the existing software build and the new software build. The new software build also can be a virtual hard drive hosting an updated version of the software. The deployment controller is configured to install and test the new software build on a test device. If errors are detected during testing of the new software build, the deployment controller can create an error report and submit the error report to a developer associated with the new software build. If the tested build virtual hard drive successfully completes testing, the new software build, or the differencing disk, can be distributed to the data center hosts.

According to another aspect, the deployment controller is configured to monitor performance of the new software build executing on the data center hosts. If errors are detected in execution of the new software build, the deployment controller can rollback the new software build and reinstate the existing software build. In some embodiments, the differencing disk is delinked from the virtual hard drive hosting the existing software build. In other embodiments, a virtual hard drive hosting the existing software build is copied to the data center hosts.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
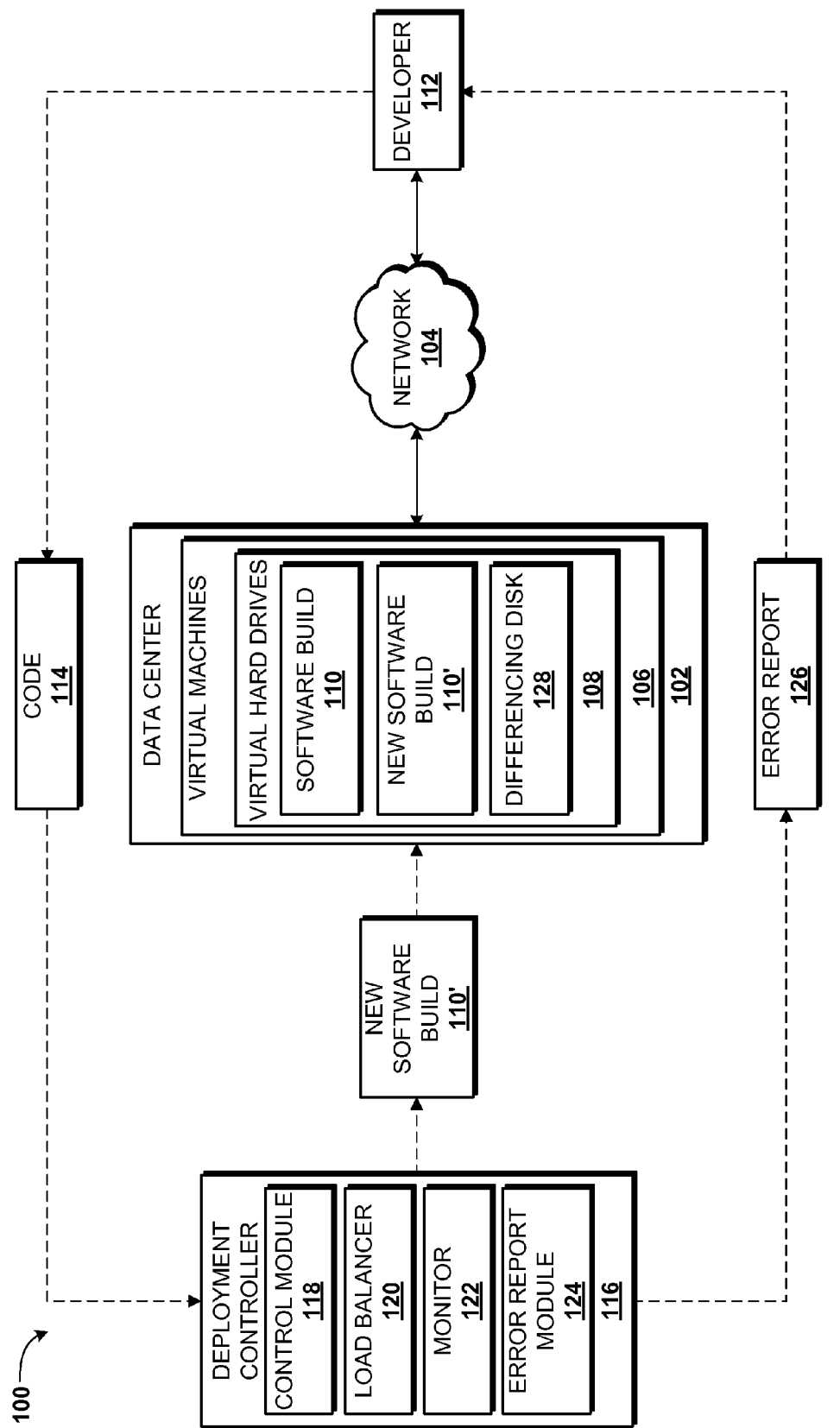
FIG. 1 is a system diagram illustrating a system for managing software builds using virtual machines, according to various illustrative embodiments disclosed herein.

The following detailed description is directed to concepts and technologies for using virtual machines to manage software builds. According to the concepts and technologies described herein, a deployment controller manages deployment of a new software build to hosts of a data center. The deployment controller compiles code corresponding to a software change to generate an installation package for installing the new software build. The deployment controller installs the new software build on a virtual hard drive or other device corresponding to a test device, and determine if errors are detected in operation of the new software build in the test environment. If the deployment controller does not detect errors in the operation of the new software build, the deployment controller can determine that the new software build is to be deployed for hosting. In some embodiments, the deployment controller creates a differencing disk storing differences between the updated software build and an existing software build and uses the differencing disk for installing the new software build for testing and/or for deploying the new software build. Installation of the new software build on the test device can therefore include copying the differencing disk to the test device and linking the differencing disk to a virtual hard drive hosting the existing software build.

The deployment controller also can manage deployment of the new software build to the data center hosts. The deployment controller can deploy the code by deploying or making available for copying a differencing disk. The deployment also can link the copied differencing disk to a virtual hard drive hosting an existing software build. Performance of the deployed new software build is monitored by the deployment controller. If errors are detected by the deployment controller during or after deployment of the new software build, the deployment controller can create an error report and report the errors to a developer associated with the code and/or the new software build. The error report can be provided to the developer to initiate error resolution.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for using virtual machines to manage software builds will be presented.

Referring now to FIG. 1, aspects of a system 100 managing software builds using virtual machines according to various embodiments presented herein will be described. The system 100 shown in FIG. 1 includes a data center 102 that can be configured to operate on or in communication with a network 104. The functionality of the data center 102 can be provided, in some embodiments, by one or more server computers and/or other computing resources. According to various implementations, the data center 102 hosts one or more virtual machines 106. The virtual machines 106 can include any number of associated virtual resources such as, for example, virtual hard drives 108.

In various embodiments, the data center 102 is configured to provide a hosted software environment for accessing and using functionality associated with an application program, software package, or other computer-executable code ("software"), a particular version of which is referred to herein as a software build 110. As shown in FIG. 1, the software build 110 can be hosted by one or more of the virtual hard drives 108 and/or the virtual machines 106. In some embodiments, the data center 102 is configured to provide functionality associated with an online collaboration software package. For example, in some embodiments, the software build 110 hosted by the data center 102 corresponds to a member of the SHAREPOINT family of collaboration products available from MICROSOFT CORPORATION in Redmond, Wash. Because the data center 102 can be configured to host any desired software, application program, or other computer-executable code, it should be understood that this embodiment is illustrative, and should not be construed as being limiting in any way.

As noted above, the data center 102 can be configured to execute or otherwise provide functionality associated with the software build 110 via one or more virtual machines 106 and/or virtual hard drives 108 configured to execute one or more components of the software build 110. For example, in some instances, two or more aspects or components of the software build 110 can be provided by two or more virtual machines 106 and/or virtual hard drives 108 hosted within the data center 102. As will be explained in more detail herein, a developer 112 can publish or release an update for the software build 110 hosted by the data center 102. The update for the software can be published as a patch, software update, or other executable code ("code") 114 that is submitted to or made available by the developer 112 for deployment. It also should be appreciated that the software build 110 can be installed by way of an installation package distributed by the developer 112. As such, the code 114 can correspond to an installation package for the software build 110, in some instances. In other instances, as is explained herein, the code 114 can correspond to an update package that, when applied to the software build 110, updates an existing software build 110 to a new software build 110'. Because the software build 110 and the new software build 110' can be hosted by multiple virtual hard drives 108 and/or virtual machines 106, deploying the new software build 110' can include updating multiple virtual resources of the data center 102.

According to various implementations of the concepts and technologies disclosed herein, the system 100 also includes a deployment controller 116 configured to control or manage compiling, deployment, and installation of the code 114, activation of the new software build 110', load balancing between virtual resources hosting the software build 110 and the new software build 110', monitoring of deployment progress or status, and/or to provide other functionality as described herein. The functionality of the deployment controller 116 can be provided by one or more server computers or other computing devices configured to provide the functionality described herein.

In some embodiments, the deployment controller 116 includes, for example, a control module 118, a load balancer 120, a monitor 122, an error reporting module 124, and/or other devices, modules, or application programs. Although the control module 118, the load balancer 120, the monitor 122, and the error reporting module 124 are illustrated as components of the deployment controller 116, it should be understood that each of these components, or combinations thereof, may be embodied as or in stand-alone devices or components operating on or in communication with the data center 102, the network 104, the developer 112, and/or the deployment controller 116. Thus, the illustrated embodiment is illustrative, and should not be construed as being limiting in any way.

The control module 118 is configured to manage and/or control the deployment, activation, and/or rollback processes described herein for managing software builds using virtual machines. In some embodiments, the code 114 corresponds to a new software build 110' and is submitted, deployed, or otherwise provided to or obtained by the control module 118. In response to determining that the code 114 corresponds to a new software build 110', the control module 118 can initiate an upgrade process.

According to various implementations described herein, the control module 118 is configured to control various aspects of management of the software builds 110, 110'. For example, the control module 118 can be configured to receive the code 114, to compile the code 114 to identify errors and/or for other purposes, and/or other operations for creating and/or assembling an installation package for updating or installing the software build 110 and/or the new software build 110'. The control module 118 also can be configured to manage testing of the new software build 110' prior to installing the new software build 110' on the virtual machines 106 of the data center 102.

Although not illustrated in FIG. 1, it should be understood that some operations of described herein with respect to the control module 118 can be offloaded to a build lab and/or a test cluster. In particular, in some embodiments, the control module 118 assigns a build lab to build the installation package and/or to create the installation package. Additionally, the control module 118 can be configured to communicate with a test cluster to install and/or test the new software build 110' prior to activation of the new software build 110' at the virtual machines 106 and/or at other times, if desired. The test cluster and/or the build lab can communicate with various file servers and/or other resources for creating virtual resources upon which to test the new software build 110', if desired. For purposes of simplifying the description herein, the functionality of the file servers are described herein as being provided by the data center 102. In light of the above description, it should be understood that this embodiment is illustrative, and should not be construed as being limiting in any way.

According to various implementations, the testing operations described herein, as well as rollout of the new software build 110' to the data center 102 can be monitored by the monitor 122. The monitor 122 also can be configured to monitor performance of the new software build 110' during testing and/or after rollout to one or more data center 102. For example, the monitor 122 can determine if the new software build 110' is operating correctly, incorrectly, with errors, without errors, and/or with a number of errors that falls within an acceptable error threshold. According to various embodiments, the monitor 122 is configured to collect data from the data center 102 and/or other hosts, to compare operation of the new software build 110' to operation of the software build 110, and/or to detect and report errors. In some implementations, the monitor 122 is configured to notify the control module 118 if a rollback process is determined to be appropriate.

According to various embodiments, the control module 118 is configured to issue commands to and receive information from the load balancer 120 and/or the monitor 122. Thus, the control module 118 can be configured to control load balancing functions of the deployment controller 116 and/or to obtain monitoring information relating to the data center 102. The load balancer 120 is configured to control routing of traffic to the data center 102 and/or to or among one or more virtual machines 106 and/or virtual hard drives hosted by the data center 102. For example, the load balancer 120 can route traffic to one or more of a first virtual machine 106 hosting the software build 110 and a second virtual machine 106 hosting the new software build 110'. The load balancing among the virtual machines 106 can be performed for testing and/or for other purposes. If errors are detected in operation of the new software build 110', the load balancer 120 may be instructed by the monitor 122 or the control module 118 to route traffic from the new software build 110' to the software build 110 during a rollback process and/or in preparation for the rollback process. These and other functionality associated with the load balancer 120 are described in more detail herein.

The error reporting module 124 can be configured to generate an error report 126 if the deployment controller 116, a component thereof, or another device or entity detects an error during creation of the new software build 110', deployment thereof, and/or during operation of the new software build 110'. According to various embodiments, the error report 126 is provided to the developer 112 associated with the new software build 110'. Thus, the developer 112 can debug the new software build 110' and/or otherwise address the errors detected in the new software build 110'. These and other aspects of reporting the errors and/or correcting errors in the new software build 110' will be described in more detail herein with reference to FIGS. 2-4.

According to various implementations of the concepts and technologies disclosed herein, the deployment controller 116 can generate and manage a differencing disk 128. According to some embodiments of the concepts and technologies disclosed herein, the differencing disk 128 is a data file or virtual hard drive file that identifies changes made to the software build 110 by the code 114. Thus, the differencing disk 128 can, alone or in combination with data corresponding to the software build 110, correspond to the new software build 110'. In some embodiments, for example, the deployment controller 116 is configured to generate the differencing disk 128 during compiling, verification, or other processes that can be performed upon receipt of the code 114. In some embodiments, the differencing disk 128 is linked to a virtual hard drive 108 hosting the software build 110 and collectively are executable to provide functionality associated with the new software build 110'. These and other implementations of the differencing disk 128 are described in more detail herein, particularly with reference to FIGS. 2-4.

The system 100 illustrated in FIG. 1 includes one data center 102, one network 104, one developer 112, and one deployment controller 116. It should be understood, however, that some implementations of the system 100 include multiple data centers 102, multiple networks 104, multiple developers 112, and/or multiple deployment controllers 116. Thus, the illustrated embodiments should be understood as being illustrative, and should not be construed as being limiting in any way.

Figure 2:
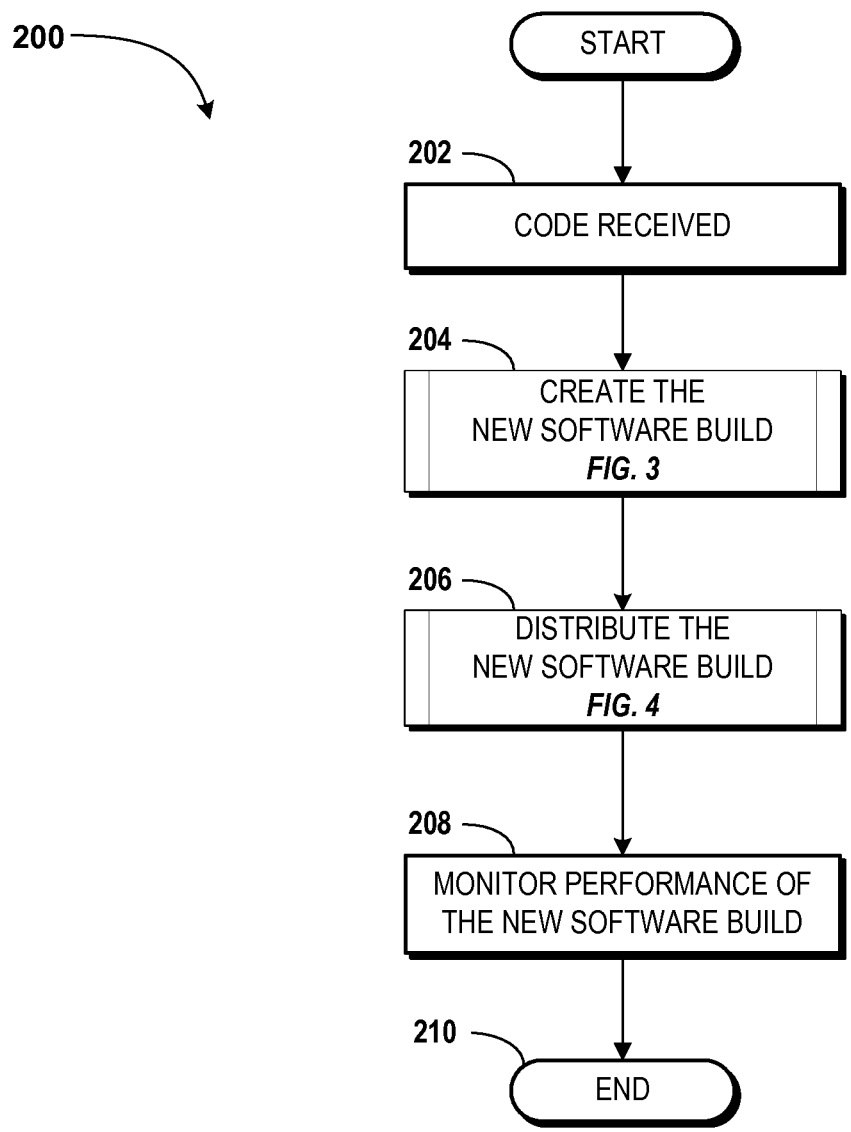
FIG. 2 is a flow diagram showing aspects of a method for using virtual machines to manage software builds, according to an illustrative embodiment.

Turning now to FIG. 2, aspects of a method 200 using virtual machines to manage software builds 110, 110' will be described in detail, according to several illustrative embodiments. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the deployment controller 116. It should be understood that these embodiments are exemplary, and should not be viewed as being limiting in any way. For example, other devices, entities, components, or modules of the system 100 can provide the functionality described herein. The method 200 begins at operation 202, wherein code 114 is received at the deployment controller 116. As explained above, in some embodiments, the code 114 corresponds to an installation or upgrade package for a new software build 110'. In some embodiments, the code 114 is received at the deployment controller 116 in response to a developer 112 submitting the code 114 for deployment or publication. It should be understood that this embodiment is illustrative, and should not be construed as being limiting in any way.

Although not separately or explicitly illustrated in FIG. 2, it should be understood from the above description of FIG. 1 that the deployment controller 116 can be configured to perform various code verification processes in addition to the other functionality described herein. For example, the deployment controller 116 or a component thereof can register the submitted code 114 with a code check-in application or device such as a build lab, compile the code 114, correct any compilation or other errors detected in the code 114, prepare an installation script or package for installing the code 114, validate the code 114 and/or the developer 112, and/or perform verification processes.

From operation 202, the method 200 proceeds to operation 204, wherein the deployment controller 116 creates the new software build 110'. According to various implementations, as will be described in more detail below, the deployment controller 116 can create the new software build 110' by requesting creation of a new virtual hard drive 108 for hosting the new software build 110' or components thereof, and/or managing and/or monitoring testing of the new software build 110'. In some embodiments, the deployment controller 116 also can be configured to determine the contents of and/or create the differencing disk 128, as explained above. Additional details of an illustrative process for creating a virtual hard drive and/or the differencing disk 128 for deploying the new software build 110' will be described in more detail below with reference to FIG. 3.

From operation 204, the method 200 proceeds to operation 206, wherein the deployment controller distributes the new software build 110'. In some embodiments, the deployment controller 116 distributes the virtual hard drive 108 hosting the new software build 110' to one or more virtual machines 106 of the data center 102. In some embodiments, the deployment controller 116 deploys the virtual hard drive 108 and a differencing disk 128 linked to the virtual hard drive 108. Additional details of an illustrative process for distributing a new software build 110'using a virtual hard drive 108 and/or the differencing disk 128 will be described in more detail below with reference to FIG. 4.

From operation 206, the method 200 proceeds to operation 208, wherein the deployment controller 116 monitors performance of the new software build 110'. As explained above with reference to FIG. 1, the deployment controller 116 can monitor performance of the new software build 110' and determine if the new software build 110' is operating with or without errors. In some embodiments, the deployment controller 116 also can determine that the new software build 110' is operating with errors, but that the number of errors and/or the nature of the errors are such that the new software build 110' should not be uninstalled or deactivated.

In some embodiments, for example, the deployment controller 116 provides bug tracking and reporting functionality for identifying and reporting errors in the new software build 110'. The deployment controller 116 can identify the errors during the test operations described in FIG. 3 and/or after rollout of the new software build 110' as described in FIG. 4. According to various implementations, the deployment controller 116 reports the errors by generating a report describing the error and identifying how the error occurred ("error report 126") that is sent to the developer 112 associated with the code 114. Additionally, if the deployment controller 116 determines, at any time, that a rollback process is appropriate, an error report 126 can be generated and provided to the developer 112 associated with the code 114. Thus, any error detected during testing or deployment of the new software build 110' can be provided to the developer associated with the new software build 110' so that the error can be investigated.

In the past, detecting and reporting errors in operation of upgraded or installed software has often been a manual process. Specifically, a human identifies errors. Upon identifying an error, the human determines a party associated with the code 114 and generates a notification that can be sent to the party to correct the error. According to various embodiments of the concepts and technologies disclosed herein, however, each new software build 110' is associated with a particular developer 112. As such, errors detected in operation of the new software build 110' can be tracked to the developer 112 and generation of the error report 126 and transmission thereof to the developer 112 can be automatically provided by the deployment controller 116. Thus, embodiments of the concepts and technologies disclosed herein can provide improved error tracking and resolution compared to previous software deployment systems. From operation 208, the method 200 proceeds to operation 210. The method 200 ends at operation 210.

Figure 3:
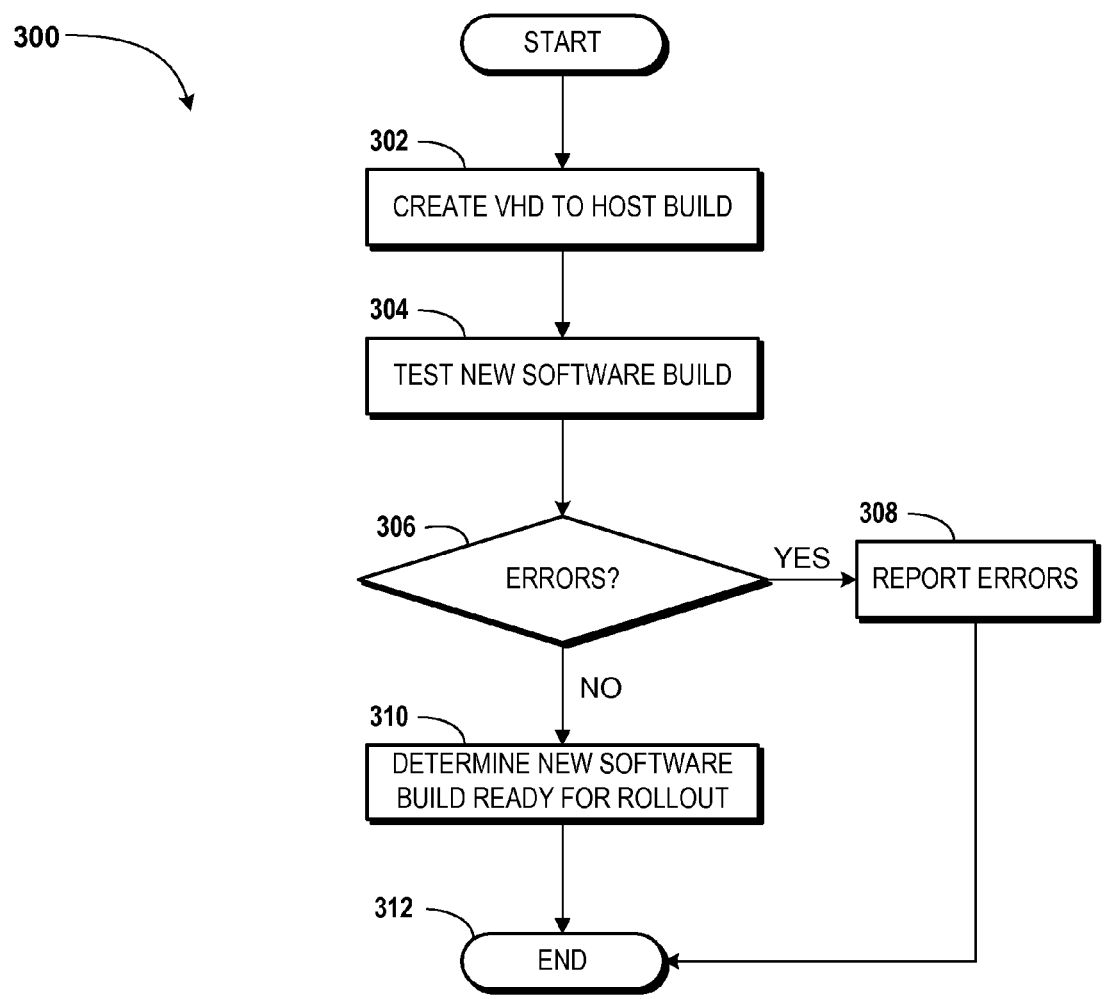
FIG. 3 is a flow diagram showing aspects of a method for creating a virtual hard drive for deploying a software build, according to an illustrative embodiment.

Turning now to FIG. 3, aspects of a method 300 for producing a new software build 110' for deployment will be described in detail. As noted above with reference to FIG. 2, the operations described herein with reference to FIG. 3 can be executed in operation 204 of the method 200, though this is not necessarily the case. It should be understood that this embodiment is illustrative, and should not be construed as being limiting in any way.

The method 300 begins at operation 302, wherein the deployment controller 116 creates a new virtual hard drive 108 for the new software build 110'. It should be understood that operation 302 can include the deployment controller 116 or another device requesting creation of a new virtual hard drive 108 to host the new software build 110'. For example, in some embodiments, the deployment controller 116 assigns creation of the new software build 110' to a build lab or other entity, and the build lab or other entity generates a request to a file server, the data center 102, and/or another device or entity for requesting the virtual hard drive 108. Operation 302 also can include various processes for determining if a physical disk has enough space to accommodate the requested virtual hard drive 108. The deployment controller 116 can determine if the data center 102 has disk space to accommodate creation of the a new virtual hard drive 108. Files can be deleted, if needed, to create the disk space needed to accommodate the new virtual hard drive 108.

In some embodiments, as mentioned above, the new software build 110' is deployed by way of deploying a differencing disk 128. Thus, operation 302 can include creation of the differencing disk 128 that, when executed or read in conjunction with the software build 110 can provide functionality associated with the new software build 110'. As noted above, the differencing disk 128 can indicate differences between the existing software build 110 and the new software build 110'. Thus, operation 302 can include requesting creation of a virtual hard drive 108 to host the differencing disk 128 and/or creating space to accommodate storage of the differencing disk 128 instead of, or in addition to, requesting creation of a virtual hard drive 108 to host the new software build 110'.

In some embodiments, the new software build 110' is installed on the virtual hard drive 108 by way of executing a virtual installation package. Thus, an installation package can be developed by the deployment controller 116 and executed to install the new software build 110' on the virtual hard drive 108. In some implementations, the installation package is embodied as a virtual external storage device for storing the installation package. For example, the deployment controller 116 can store the installation package on one or more virtual floppy drives, network drives, virtual compact disk drives, combinations thereof, and the like. Thus, the installation of the new software build 110' on the virtual hard drives 108 can be initiated and executed from virtual resources, if desired. Execution of an installation package from the virtual external storage devices also can be used to create the differencing disk 128, if desired.

From operation 302, the method 300 proceeds to operation 304, wherein the deployment controller 116 tests the new software build 110'. As mentioned above, the new software build 110' can be embodied as a program executing on a virtual hard drive 108 and/or as a virtual hard drive 108 hosting an existing version of the software build 110 and a linked differencing disk 128 that indicates changes made to the software build 110 to obtain the new software build 110'. Although not separately illustrated in FIG. 3, operation 304 can include requesting creation or allocation of test resources and installation of the new software build 110' on the test resources. If a differencing disk 128 is used to distribute the new software build 110', operation 304 can include linking the differencing disk 128 to a virtual hard drive 108 hosting the software build 108 and distributing the differencing disk 128 and data indicating the association between the differencing disk 128 and the virtual hard drive 108 to the test resources.

From operation 304, the method 300 proceeds to operation 306, wherein the deployment controller 116 determines if the new software build 110' is operating with or without errors. In some embodiments, the deployment controller 116 determines if any errors are detected during the testing of the new software build 110'. In other embodiments, the deployment controller 116 determines if any errors detected in operation 306 exceed an error threshold in terms of numbers of errors or the severity thereof. Thus, in some embodiments the deployment controller 116 is configured to ignore certain types of errors while in other embodiments, the deployment controller 116 is configured to report any errors to the developer 112 for correction, regardless of the severity or number of errors detected in operation 306.

If the deployment controller 116 determines, in operation 306, that errors have been detected during testing of the new software build 110', the method 300 can proceed to operation 308. In operation 308, the deployment controller 116 can report the detected errors. In some embodiments, the deployment controller 116 reports the errors to the developer, for example, by way of generating an error report 126. The deployment controller 116 can transmit the error report 126 to the developer 112 and/or otherwise make the error report 126 available to the developer 112 to inform the developer 112 of the error and/or initiate an error resolution process. Although not explicitly illustrated in FIG. 3, the deployment controller 116 also can interrupt or cancel rollout of the new software build 110' in the event of detecting errors in operation 306.

If the deployment controller 116 determines, in operation 306, that errors have not been detected during testing of the new software build 110', the method 300 proceeds to operation 310. As noted above, the method 300 also can proceed to operation 310 if the deployment controller 116 determines, in operation 306, that errors detected during testing of the new software build 110' are not of sufficient severity or numbers to justify interrupting rollout of the new software build 110'. Nonetheless, as mentioned above, the deployment controller 110 can report any errors detected in operation 306 to the developer, if desired.

In operation 310, the deployment controller 116 can determine that the new software build 110' is ready for rollout to one or more data centers 102. Thus, operation 310 can include determining that the virtual hard drive 108 hosting the new software build 110' is ready for deployment and/or that a virtual hard drive 108 and associated or linked differencing disk 128 are ready for deployment. Deployment of the new software build 110' is discussed in more detail below with reference to FIG. 4. From operation 310, the method 300 proceeds to operation 312. The method 300 ends at operation 312.

Figure 4:
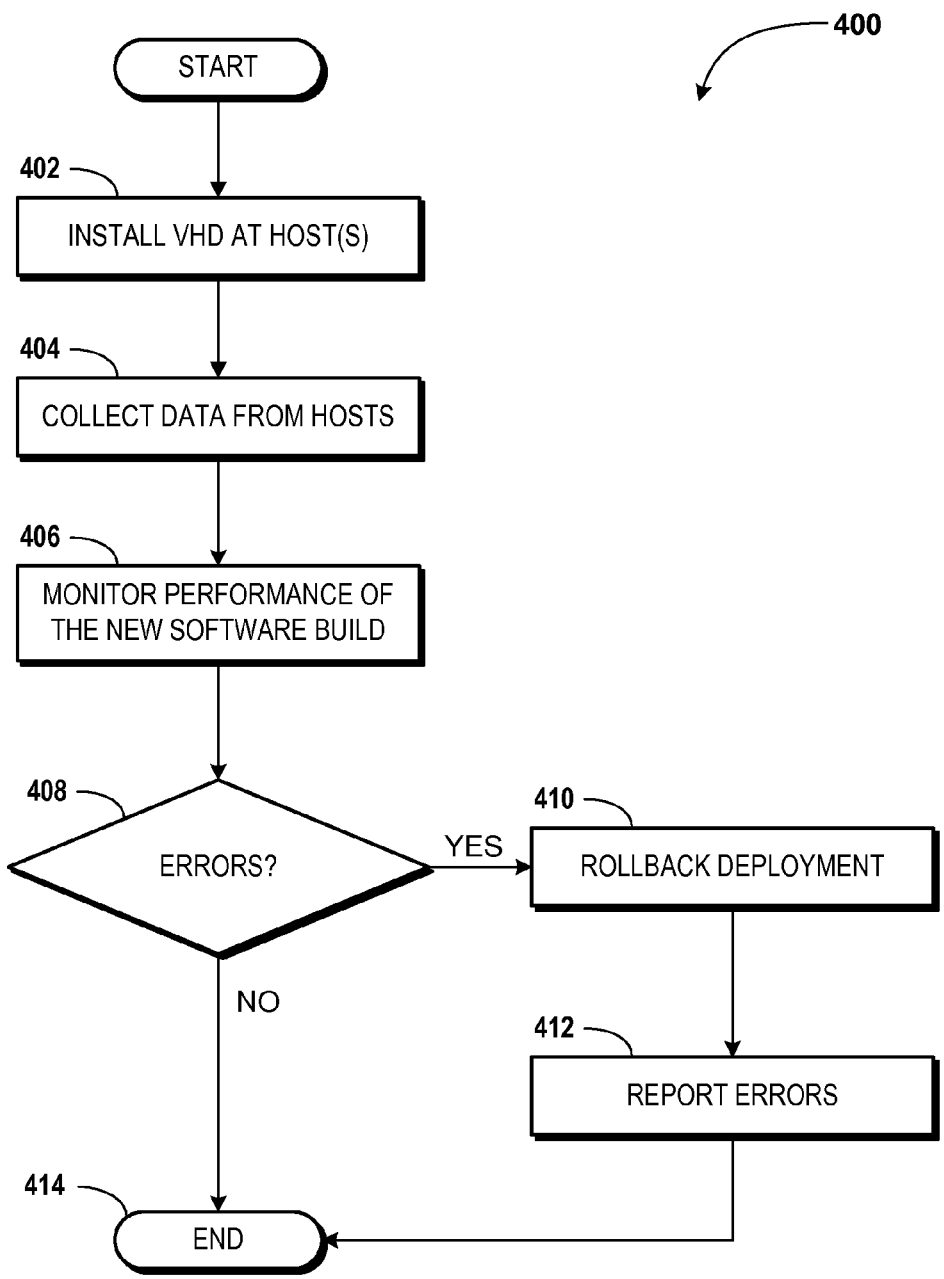
FIG. 4 is a flow diagram showing aspects of a method for distributing a software build using a virtual hard drive, according to an illustrative embodiment.

Turning now to FIG. 4, aspects of a method 400 for distributing the new software build 110' using virtual hard drives 108 will be described in detail, according to an illustrative embodiment. As noted above with reference to FIG. 2, the operations described herein with reference to FIG. 4 can be executed at operation 206 of the method 200, though this is not necessarily the case. Furthermore, as discussed above with reference to FIG. 3, the method 400 can be executed if the deployment controller 116 determines that the new software build 110' is ready for deployment in operation 310 of the method 300, though this not necessarily the case.

The method 400 begins at operation 402, wherein the deployment controller 116 releases the new software build 110' for installation at one or more hosts such as the data center 102 and/or installs the new software build 110' at the one or more hosts such as the data center 102. As explained above, the new software build 110' can be distributed by way of distributing the differencing disk 128. In some embodiments, a differencing disk 128 is used to distribute the new software build 110'. Thus, some embodiments of the concepts and technologies disclosed herein enable distribution of the new software build 110' by way of distributing the differencing disk 128 instead of distributing an installation package to upgrade a software build 110 or components thereof hosted by the data center 102. These embodiments can help relieve the data center 102 and/or other entities from performing time- and other resource-consuming installation processes.

Furthermore, it can be appreciated that by using a differencing disk 128, some embodiments of the concepts and technologies disclosed herein allow rollback of the new software build 110' by way of delinking the differencing disk 128 from a parent disk such as a virtual hard drive 108 hosting the software build 110. Similarly, the new software build 110' can be rolled out by copying the differencing disk 128 instead of copying virtual hard drives 108 embodying a full version of the new software build 110'.

Thus, in some embodiments, operation 402 includes making a copy of the differencing disk 128 available to the data center 102 or other host, and commanding the data center 102 or other host to reference the differencing disk when executing the software build 110 currently hosted by the data center 102 or other host. As explained above, the data center 102 or other host can link the differencing disk 128 to the virtual hard drive 108 hosting the software build 110. Thus, the new software build 110' can be distributed by way of distributing a comparatively small amount of data and by way of processes that consume little in terms of time and other resources.

From operation 402, the method 400 proceeds to operation 404, wherein the deployment controller 116 collects data from the hosts such as the data center 102. The data collected in operation 404 can include operational data that describes performance of the new software build 110'. The method 400 proceeds from operation 404 to operation 406, wherein the deployment controller 116 monitors performance of the new software build 110'. In operation 406, the deployment controller 116 can monitor performance of the new software build 110' to determine if any errors have been identified during deployment or activation of the new software build 110'.

From operation 406, the method 400 proceeds to operation 408, wherein the deployment controller 116 determines if errors have been detected in the new software build 110'. If the deployment controller 116 determines, in operation 408, that errors are detected in the new software build 110', the method 400 proceeds to operation 410, wherein the deployment controller 116 can begin a rollback process for uninstalling the new software build 110' and/or reinstalling or reactivating the software build 110. If a differencing disk 128 is used to distribute the new software build 110', operation 408 can include delinking the differencing disk 128 from a virtual hard drive 108 hosting the software build 110 to effect rollback of the new software build 110'.

From operation 410, the method 400 proceeds to operation 412, wherein the deployment controller 116 can report errors detected in operation 406. The reporting of errors has been described in operation 308 of FIG. 3 and can be substantially similar, if desired, in operation 412.

If, at operation 408, the deployment controller 116 determines that errors are not detected in the deployed new software build 110', or if the detected errors are not of sufficient severity or numbers to justify the functionality discussed with reference to operations 410 and 412, the method 400 can proceed to operation 414. Similarly, from operation 412, the method 400 proceeds to operation 414. The method 400 ends at operation 414.

As explained above with reference to FIG. 3, the deployment controller 116 can be configured to report any detected errors to the developer 112, if desired, even in cases in which the deployment controller 116 elects not to rollback an installation of the new software build 110'. Thus, the functionality of operation 412 can be provided by the deployment controller 116 for any errors detected in operation 408, if desired.

Figure 5:
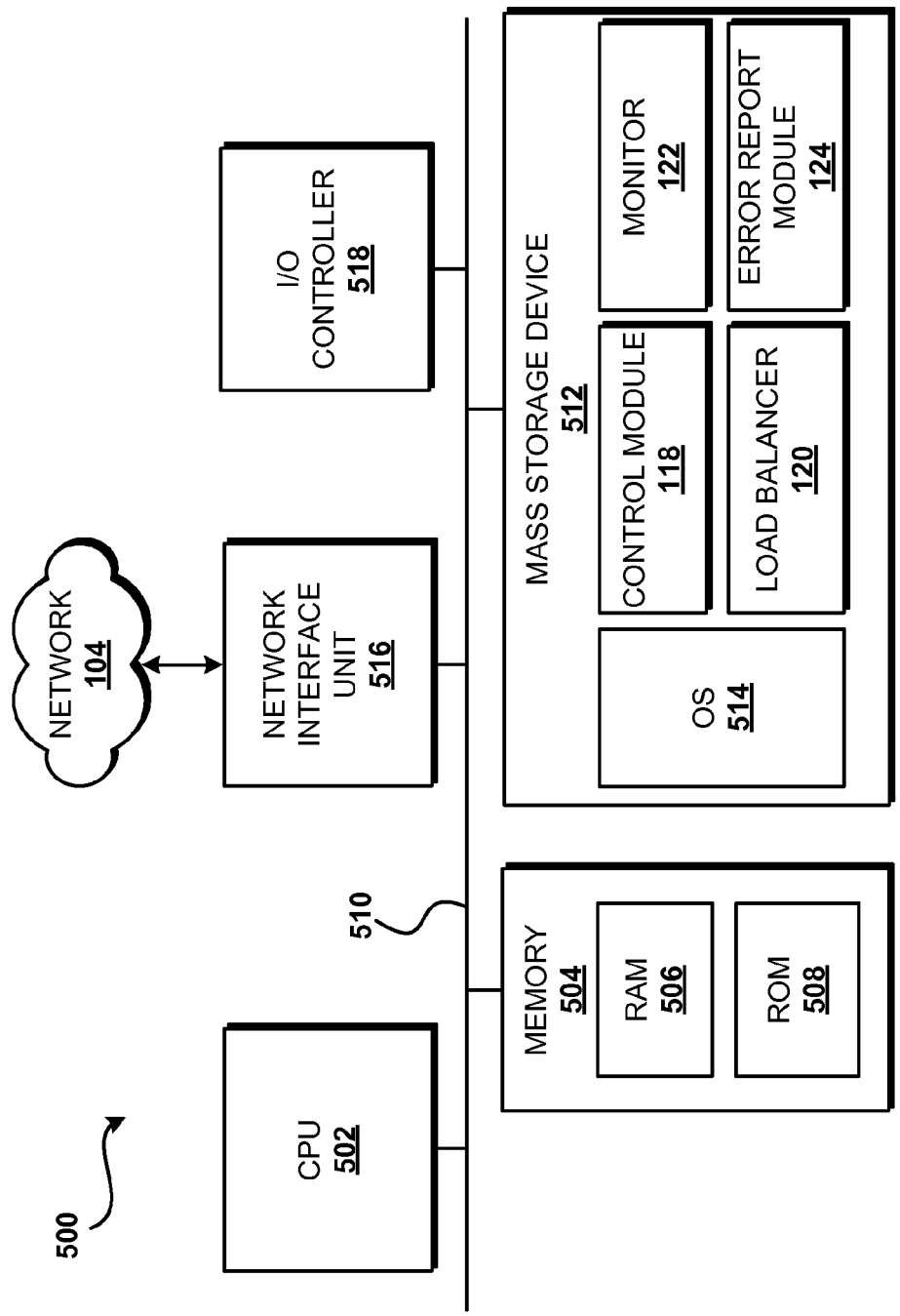
FIG. 5 is a computer architecture diagram illustrating an illustrative computer hardware and software architecture for a computing system capable of implementing aspects of the embodiments presented herein.

FIG. 5 illustrates an exemplary computer architecture 500 for a device capable of executing the software components described herein for using virtual machines to manage software builds 110, 110'. Thus, the computer architecture 500 illustrated in FIG. 5 illustrates an architecture for a server computer, a desktop computer, a netbook computer, a tablet computer, a laptop computer, and/or another computing device. In some embodiments, the computer architecture 500 corresponds to the deployment controller 116 or another device configured to provide the functionality described herein for using virtual machines to manage software builds 110, 110'. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 514, the control module 118, the load balancer 120, the monitor 122, the error reporting module 124, and/or other or alternative application programs. Although not shown in FIG. 5, the mass storage device 512 also can be configured to store the differencing disk 128, as well as the various components of the data center 102, if desired.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network such as the network 104. The computer architecture 500 may connect to the network 104 through a network interface unit 516 connected to the bus 510. It should be appreciated that the network interface unit 516 also may be utilized to connect to other types of networks and remote computer systems. The computer architecture 500 also may include an input/output controller 518 for receiving and processing input from a number of other devices, including a keyboard, mouse, or electronic stylus (not shown in FIG. 5). Similarly, the input/output controller 518 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that technologies for using virtual machines to manage software builds have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:
1. A computer-implemented method for managing software builds, the computer-implemented method comprising performing computer-implemented operations for:
receiving code corresponding to an update for an existing software build hosted by a data center;

creating a new software build based upon the code, the new software build comprising a new version of the existing software build;

creating a virtual hard drive to host the new software build and creating a differencing disk comprising the virtual hard drive storing data indicating a difference between the existing software build and the new software build;

installing the new software build on the virtual hard drive;

distributing the new software build to a data center for hosting at the data center; and monitoring performance of the new software build hosted by the data center.

2. The method of claim 1, further comprising testing the new software build installed on the virtual hard drive.

3. The method of claim 2, further comprising:

determining if an error is detected during execution of the new software build during the testing;

in response to determining that the error is not detected, determining that the new software build is ready for distribution to the data center; and in response to determining that the error is detected, reporting the error.

4. The method of claim 3, wherein reporting the error comprises:

generating an error report that identifies the new software build and the error detected; and transmitting the error report to a developer associated with the new software build.

5. The method of claim 1, wherein creating the virtual hard drive further comprises:

linking the differencing disk to the virtual hard drive hosting the existing software build.

6. The method of claim 5, wherein distributing the new software build comprises:

copying the differencing disk to the data center; and linking the copied differencing disk to the virtual hard drive hosting the software build.

7. The method of claim 1, wherein distributing the new software build comprises:

installing the new software build at the data center;

monitoring performance of the new software build; and determining if an error is detected in the new software build hosted by the data center.

8. The method of claim 7, further comprising:

determining if the error is detected during execution of new software build; and in response to determining that the error is detected, rolling back deployment of the new software build and reporting the error.

9. The method of claim 7, further comprising copying the differencing disk to the data center, and linking the copied differencing disk to a virtual hard drive hosting the existing software build, and wherein rolling back deployment of the new software build comprises delinking the differencing disk from the virtual hard drive hosting the existing software build.

10. The method of claim 1, wherein creating the new software build comprises executing a virtual installation package to install the new software build on a virtual hard drive.

11. The method of claim 10, wherein the virtual installation package is stored on and executed on a virtual external storage device.

12. A computer-implemented method for managing software builds, the computer-implemented method comprising performing computer-implemented operations for:

receiving code at a deployment controller, the code corresponding to an update for an existing software build hosted by a data center;

creating a new software build based upon the code, the new software build comprising a new version of the existing software build hosted by the data center;

creating a differencing disk storing data indicating differences between the existing software build and the new software build;

distributing the new software build to the data center for hosting by copying the differencing disk to the data center and linking the differencing disk to a virtual hard drive hosting the existing software build at the data center; and monitoring performance of the new software build hosted by the data center.

13. The method of claim 12, further comprising testing the new software build before creating the differencing disk, wherein testing the new software build comprises:

creating a virtual hard drive to host the new software build;

installing the new software build on the virtual hard drive; and testing the new software build installed on the virtual hard drive.

14. The method of claim 13, further comprising:

determining if any errors are detected during execution of the new software build during testing;

in response to determining that no errors are detected, determining that the new software build is ready for rollout to the data center; and in response to determining that errors are detected, reporting the errors to a developer associated with the code.

15. The method of claim 14, wherein reporting the errors comprises:

generating an error report that identifies the new software build and the error detected; and transmitting the error report to a developer associated with the new software build.

16. The method of claim 12, wherein creating the new software build comprises executing a virtual installation package to install the new software build on the virtual hard drive, and wherein the virtual installation package is stored on and executed on a virtual external storage device.

17. A computer storage medium having computer readable instructions stored thereupon that, when executed by a computer, cause the computer to:

receive code at a deployment controller, the code corresponding to an update for an existing software build hosted by a data center;

create a new software build based upon the code, the new software build comprising a new version of the existing software build hosted by the data center;

creating a differencing disk storing data indicating differences between the existing software build and the new software build;

install the new software build on a test device;

monitor performance of the new software build on the test device to determine if the new software build is to be deployed; and in response to determining that no errors are detected during execution of the new software build on the test device, distribute the new software build to the data center for hosting by copying the differencing disk to the data center and linking the differencing disk to a virtual hard drive hosting the existing software build at the data center; and monitor performance of the new software build hosted by the data center.

18. The computer storage medium of claim 17, further comprising computer-executable instructions that, when executed by the computer, cause the computer to:
   determine if an error is detected during execution of the new software build hosted by the data center;
   in response to determining that the error is detected, report the error.

19. The computer storage medium of claim 18, wherein reporting the error comprises:
   generating an error report that identifies the new software build and the error detected; and
   transmitting the error report to a developer associated with code.

* * * * *